United States Patent [19]

Bullen

[11] 4,448,709

[45] May 15, 1984

[54] PROPPANT CONCENTRATOR

[76] Inventor: Ronald S. Bullen, 700 703 6 Ave., Calgary, Alberta, Canada, T2P 0T9

[21] Appl. No.: 289,623

[22] Filed: Aug. 3, 1981

[30] Foreign Application Priority Data

Nov. 6, 1980 [CA] Canada .................................. 364139

[51] Int. Cl.[3] ...................... B01D 12/00; B01D 43/00; E21B 43/26; E21B 43/267

[52] U.S. Cl. ................................ 252/359 D; 166/280; 166/308; 210/304; 210/512.1; 252/359 E; 261/DIG. 26; 366/3; 366/336

[58] Field of Search .......... 252/359 R, 359 A, 359 D, 252/359 E, 8.55 R, 317; 159/DIG. 4; 166/177, 280, 308; 210/304, 512.1, 512.2; 209/17; 261/DIG. 26; 366/3, 5, 336, 337

[56] References Cited

U.S. PATENT DOCUMENTS

| | | | |
|---|---|---|---|
| 3,271,929 | 9/1966 | Bowden et al. | 55/52 |
| 3,372,532 | 3/1968 | Campbell | 210/512.1 |
| 3,517,821 | 6/1970 | Monson et al. | 210/512.1 |
| 3,685,807 | 8/1972 | Campbell | 366/3 |
| 3,828,929 | 8/1974 | Hickey | 210/512.1 |
| 3,937,283 | 2/1976 | Blauer et al. | 166/308 |
| 4,126,181 | 11/1978 | Black | 166/280 |
| 4,127,332 | 11/1978 | Thiruvengadam et al. | 252/359 D |
| 4,176,064 | 11/1979 | Black . | |
| 4,183,813 | 1/1980 | Black et al. | 210/512.1 |

FOREIGN PATENT DOCUMENTS

| | | | |
|---|---|---|---|
| 1057189 | 6/1979 | Canada . | |
| 1057649 | 7/1979 | Canada . | |
| 1093520 | 1/1981 | Canada . | |
| 1093519 | 1/1981 | Canada . | |
| 1096781 | 3/1981 | Canada . | |
| 1108186 | 6/1961 | Fed. Rep. of Germany | 210/304 |
| 607603 | 5/1978 | U.S.S.R. | 210/512.1 |

OTHER PUBLICATIONS

Anderson et al., "The Sand Intensifier–Its Development and Application to Fracturing"; Paper No. 79-3-0-39 of Petroleum Society of CIM Meeting; May 1979.

*Primary Examiner*—Bradley Garris

*Attorney, Agent, or Firm*—Seidel, Gonda & Goldhammer

[57] ABSTRACT

This invention is concerned with an apparatus for concentrating a proppant fluid slurry. The concentration is carried out in a casing containing an axial elongated screen. Stationary angled vanes direct the slurry in a helical path in the space between the casing and the elongated tubular screen to avoid the problems of rotating members. The concentrating zone thus provided communicates with a mixing zone where baffles provide restricted flow between the edges of the baffles and the interior of the casing to give a mixing action, disperse slugs of slurry, and to avoid back flow of gas. The baffles are advantageously of resilient material. The mixing zone then leads to a foaming zone, followed by the outlet. It is advantageous to have inlet, concentrating zone, mixing zone, foaming zone and outlet for the foamed slurry in axial alignment and without interruptions so as to give a straight through flow. There are also inventive features contributing to maintenance in that the interior assembly can be removed as one piece upon removal of the inlet end flange and the removal through an assembly flange of a locating member.

19 Claims, 5 Drawing Figures

PROPPANT CONCENTRATOR

BACKGROUND OF THE INVENTION

Economic considerations make it desirable to extract, through each oil or gas well drilled, as much of the desired product as possible. As the size of the wellbore is always extremely small relative to the area of the production formation, the migration of the products to the well is a major concern in oil and gas production. Problems can arise if the product is impeded from easily migrating to the extraction well due to the restrictive physical properties of the matrix in which it lies. With gas and oil wells one way to solve this problem is to fracture or create cracks in the rock formation around the bottom of the well, so the desired product can move to the well more freely.

A common method of creating cracks in rock formations is called foam fracturing. Gelled fluid (usually water) is mixed with a particulate proppant (usually coarse sand). The proppant material becomes suspended in the gelled fluid. A foaming agent and delayed action gel breaker are added. Then, the slurry is pumped down the well at a very high pressure. However, just before it goes down the well a gas (usually nitrogen) is injected into the proppant/fluid slurry in a ratio of about three parts gas to one part fluid. This mixture creates a foam. At the production formation level there are a series of holes in the well casing through which the foam can move into the rock formation. When the pressure becomes high enough the formation starts to crack. The pressure is maintained as the crack enlarges and the proppant bearing foamed gel is injected into the fracture. Then, after a short time, the gel breaker causes the liquid to regain its original viscosity. A valve is opened at the wellhead and pressure from the gas injected into the fracture blows the fluid back out to the surface, leaving the proppant caught in the crack to hold it open. The presence of the fracture allows the product easier access to the well for removal to the surface.

As the primary function of the fluid in the injected slurry is simply to act as a carrier for the proppant and as the presence of water can often cause serious problems in the production zone, it is often desirable to fracture using a high proppant/fluid ratio slurry. Although this requirement most often arises when water is being used as the carrier medium, it is often advantageous to have high proppant concentrations when using other liquids as well.

If it were not for the physical limitations of the high pressure pumps used, increasing proppant concentrations would not be a problem. However, even the most modern and efficient pumps will not pump proppant/fluid slurry at concentrations much higher than ten pounds of proppant per U.S. gallon of liquid, at the pressures required for fracturing. At concentrations above this critical ratio the pumps tend to simply plug up with proppant and stop. These requirements and problems have led to the development of a proppant concentrator which is placed in high pressure frac lines between the pumps and the wellhead. By removing fluid at that point the concentrator allows the slurry to pass through the pumps with enough fluid to avoid "sand-offs" while creating a high proppant-ratio slurry before injection into the production formation.

Sand concentrations for use in fracturing have previously been proposed. An example is in a preprint by the Petroleum Society of CIM. Paper No. 79-30-39 entitled "The Sand Intensifier—Its development and application to fracturing" for a paper presented May 8, 11, 1979. The apparatus described was a sand concentrator and not a combined concentrator and foamer. There was a cylindrical casing containing an impeller which is rotated with consequent problems of high abrasive wear, shaft sealing, and the danger of stalling due to piling up of sand. There is no straight through axial flow of both inlet and outlets. The outlets are in the sides of the cylinder and a central diaphragm seals the slurry from the clean water section.

OBJECT OF THE INVENTION

It is the object of this invention to provide an improved apparatus for the separation and removal of fluid (normally gelled water) from a slurry wherein a particulate proppant (normally sand) is contained and held in suspension in said gelled fluid.

It is a further object of the invention in its preferred aspect to provide an apparatus to facilitate the foaming of the resulting concentrated slurry through the addition of a gas such as nitrogen.

BRIEF DESCRIPTION OF THE INVENTION

A number of inventive features are included in accordance with this invention in its preferred aspect. Thus the concentration is carried out in a casing containing an axial elongated screen, stationary angled vanes direct the slurry in a helical path in the space between the casing and the elongated tubular screen to avoid the problems of rotating members. The concentrating zone thus provided communicates with a mixing zone where baffles provide restricted flow between the edges of the baffles and the interior of the casing to give a mixing action, disperse slugs of slurry, and to avoid back flow of gas. The baffles are advantageously of resilient material to allow passage of highly concentrated sand slugs without plugging. The mixing zone then leads to a foaming zone followed by the outlet. It is advantageous to have inlet, concentrating zone, and outlet for the foamed slurry in axial alignment and without interruptions so as to give a straight through flow.

In accordance therefore with one aspect of this invention, an apparatus is provided for concentrating a proppant/fluid slurry and foaming the concentrated slurry comprising a casing having an inlet for the proppant/fluid slurry that is to be concentrated and an outlet for foamed concentrated proppant/fluid slurry means for withdrawing fluid through an additional outlet from the proppant/fluid slurry admitted through the inlet in a concentration zone to provide a concentrated proppant/fluid slurry, a passage including a mixing zone to conduct the concentrated proppant/fluid slurry to a foaming zone where the slurry is foamed with gas under pressure, and at least one baffle in said passage each baffle providing restricted flow past the baffle to increase the velicity of the concentrated slurry so as to disperse slugs of slurry and to avoid back flow of gas.

In accordance with this invention in another aspect an apparatus is provided for concentrating a proppant/fluid slurry comprising a casing having an inlet for the proppant/fluid slurry that is to be concentrated an outlet for concentrated slurry and an additional outlet for fluid withdrawn from the proppant/fluid slurry, and means for withdrawing fluid from the proppant/fluid slurry comprising an elongated tubular screen extending axially of the casing and communicating with said additional outlet and stationary angled vanes arranged to cause proppant/fluid slurry entering through the inlet to flow in a helical path in the space between the casing and the elongated tubular screen.

In accordance with a further aspect of this invention an apparatus is provided for concentrating a proppant/fluid slurry and foaming the concentrated slurry comprising a cylindrical casing having an inlet at one end for the proppant/fluid slurry followed by a concentration zone, a mixing zone, a foaming zone and an outlet for foamed concentrated proppant/fluid slurry at the other end, the inlet, concentration zone, mixing zone and foaming zone and outlet being in axial alignment and free from interruptions that would prevent straight through flow.

In accordance with another aspect of this invention there is provided an apparatus for concentrating a proppant/fluid slurry comprising a cylindrical casing, an inlet flange at the inlet end of said cylindrical casing, a tubular sandscreen coaxial with the cylindrical casing and mounted on said inlet flange, a fluid removal outlet fitting secured to the side of the cylindrical casing and having an inwardly facing recess, an elbow communicating between the interior of the tubular sandscreen and the fluid removal outlet removable fitting within said recess, an assembly flange at the diametrically opposite side of the cylindrical casing to the fluid removal outlet, said assembly flange having a removable cover and locating means within it projecting into the cylindrical casing to engage said elbow and hold said elbow in position in the recess, said flange, sandscreen and elbow being removable as a unit for maintenance by removing said cover and withdrawing said means projecting into the cylindrical casing.

It should be noted that although most fracturing jobs in which the invention could be utilized will be done using water as the carrier fluid, sand as the proppant material, and nitrogen gas, other fluids (for example hydrocarbon fractions), other proppants (for example glass beads) and other gases (for example inert gases) may be used. The invention is designed to work using any of the known carrier fluids, proppant materials and foaming gases, and any combination thereof.

DETAILED DESCRIPTION

Figure 1:
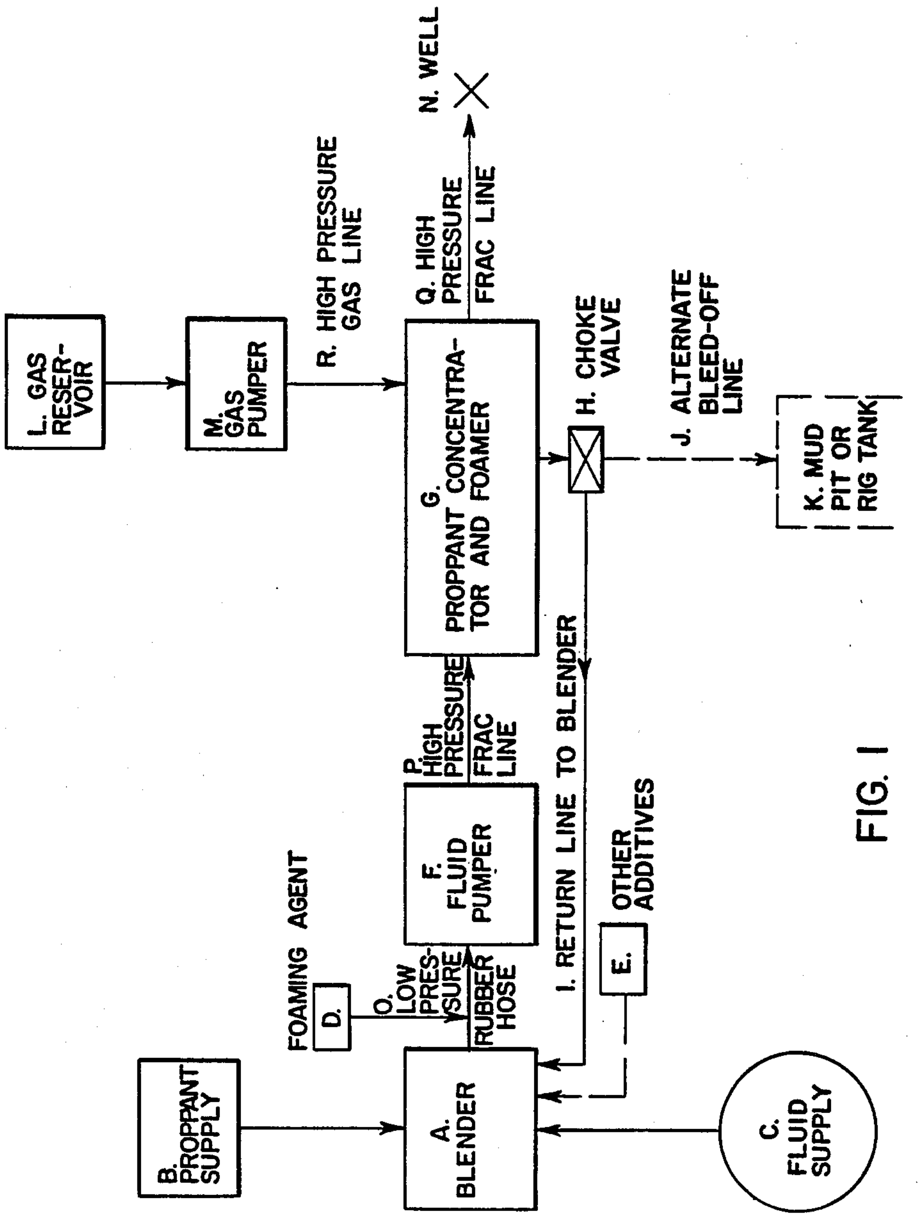
FIG. 1 shows a diagrammatic representation of the equipment used in a fracturing process wherein the invention is utilized.

FIG. 1 shows the operation of an apparatus in accordance with this invention in context with the equipment used in a fracturing process. Fluid (usually water) is drawn from fluid reservoir (C) into blender (A). A gelling agent (E) is added and the fluid is circulated between the blender (A) and the fluid reservoir (C) until the gel sets up. Other additives (E), such as for example KCl, may also be added. Particulate proppant (B) (usually sand) is added and the slurry is mixed in the blender (A) until the proppant becomes suspended in the gelled fluid. The slurry is then pumped through a rubber hose, or hoses (0) to the fluid pumper, or pumpers (F). As it leaves the blender (A) a foaming agent (D) is added. From the fluid pumpers (F) the gelled slurry is forced, under pressure, through a high pressure frac line (P) and enters the proppant concentrator (G).

The concentrator (G) removes fluid from the proppant/fluid slurry and thus "concentrates" the proppant material. The extracted fluid is then either recycled back to the blender (A) through a return line (I) or simply discarded into a rig tank or pit (K) through an alternative bleedoff line (J).

Although the concentrator (G) is capable of extracting a very high percentage of the fluid from the slurry (restricted only by the ability of the concentrated proppant to flow through the concentrator itself), under normal conditions only about 50 percent of the fluid is removed, thus doubling the proppant concentration in the slurry.

The amount of fluid removed is varied and controlled by varying the size or number of orifices in the choking device (H) attached to the fluid bleedoff pipe.

After the slurry has been concentrated in the fluid removal section it passes into the foaming chamber. In this chamber gas (usually nitrogen) is injected into the slurry under pressure. The gas is drawn from gas reservoir (L) pressurized by gas pumper (M) and injected through high pressure gas line (R). The gas is injected into the foaming chamber in a ratio, with respect to liquid in the slurry, that will yield a foam of from about 0.53 to about 0.99 "Mitchell quality". Mitchell quality is a measure of the gas to fluid ratio in fracturing foam and is described in U.S. Pat. No. 3,937,283 (Blauer and Durborow). Normally a foam quality of 75 percent (i.e. Mitchell quality 0.75) is used for foam fracturing operations. This means that the foam is comprised of 25 percent fluid and 75 percent gas.

From the proppant concentrator (G) the foamed slurry passes through a high pressure frac line (Q) and down the well (N) for eventual injection into the production formation.

The following example will indicate the advantages of concentrating the slurry.

If 10 pounds of proppant are mixed into every U.S. gallon of gelled fluid passing through the blender (A), the proppant/fluid ratio at the pumpers (F) would be 10 pounds per gallon. A ratio of about 10 pounds per gallon represents the maximum proppant concentration which can be pumped by the modern high pressure fluid pumpers commonly used in the fracturing industry.

If no proppant concentrator is used and the slurry is simply foamed at a gas injection manifold incorporated into the high pressure frac line (P), as is normally done, the maximum proppant concentration that can be achieved in the foam is about $2\frac{1}{2}$ pounds of proppant per U.S. gallon of foam. This assumes that the normal foam quality of 75 percent is desired. The $2\frac{1}{2}$ pound per gallon maximum is a result of foaming a 10 pound per gallon slurry at a gas to fluid ratio of 3 to 1.

Foam with a Mitchell quality of 75 percent is capable of carrying proppant concentrations of up to about 8 pounds of proppant per gallon of foam. This means that an initial proppant concentration in the slurry, before foaming, of up to 32 pounds per gallon could be used.

The advantage that the concentrator offers is that it removes fluid from the slurry after the slurry has passed through the fluid pumps (F). Under normal and usual conditions the choking device (H) will be set so as to allow about 50 percent of the fluid to be removed from the slurry. In such a case a 10 pound per gallon proppant/fluid slurry passed through the fluid pumpers (F) would be increased by the invention to a concentration of 20 pounds per gallon of fluid. When a 20 pound per gallon slurry is foamed to a Mitchell quality of 75 percent by the addition of 3 parts gas to 1 part fluid (by volume), the proppant concentration becomes 5 pounds of proppant per gallon of foam. Such a concentration is twice that attainable using conventional procedures without a concentrator.

It is normal procedure during fracturing operations to vary the proppant concentrations over the course of the job.

The conventional method of varying proppant concentrations is to vary the proppant input at the blender (A) while maintaining a constant rate of fluid flow. The use of the choking device (H) to vary the percentage of fluid removed from the slurry is an additional method of facilitating desired changes in proppant concentration.

Referring now to the embodiment illustrated in FIGS. 2 to 5 inclusive, the apparatus is capable of concentrating the proppant/fluid slurry and foaming the concentrated slurry. It comprises a cylindrical casing 10 at the inlet end of which is an inlet fitting 11 which is to be connected to the high pressure frac line (P) coming from fluid pumper (F) in FIG. 1. At the outlet or discharge end there is fitting 12 which communicates with the high pressure frac line (Q) in FIG. 1, which in turn leads to the well (N). The casing 10 is fitted with a gas inlet 13 for the high pressure gas line (R) of FIG. 1. Liquid removed by the apparatus goes through liquid outlet fitting 14 leading to a flow control choke valve 15 which is the valve identified by the letter (H) in FIG. 1. Within casing 10 there is a concentration zone generally indicated by the numeral 16, a mixing zone generally indicated by the numeral 17, and a foaming zone generally indicated by the numeral 18. Inlet 11, concentration zone 16, mixing zone 17, foaming zone 18 and discharge 12 are in axial alignment to provide straight through flow.

Figure 2:
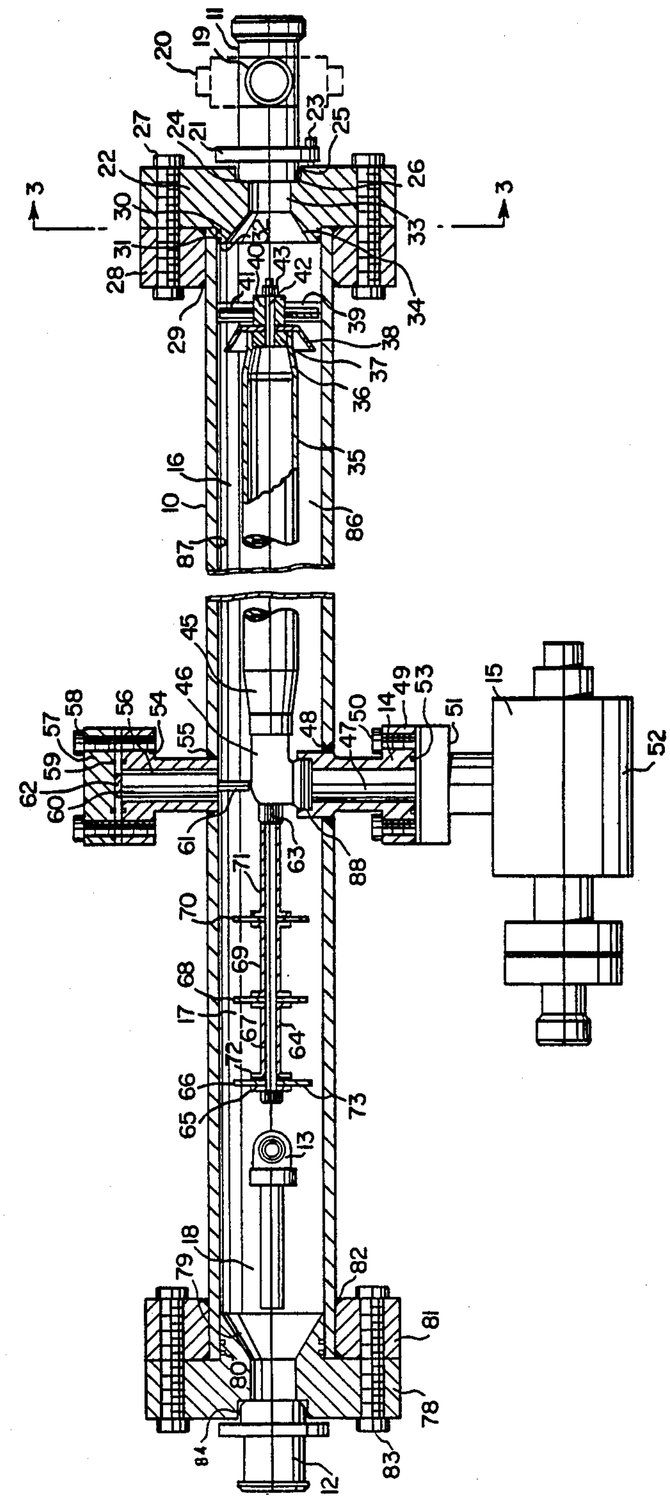
FIG. 2 is a plan sectional view of apparatus in accordance with this invention.
Figure 3:
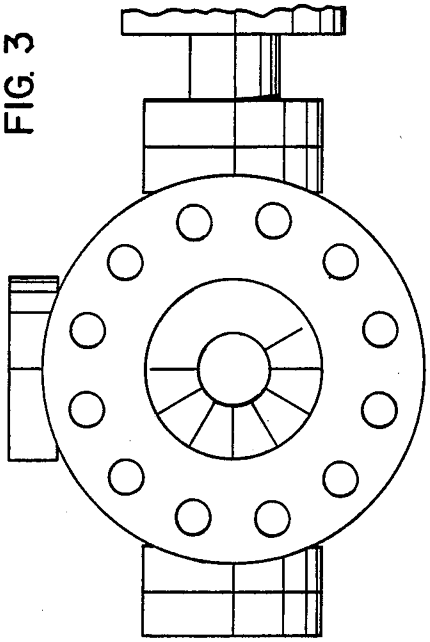
FIG. 3 is a section elevation view on the line 3—3 of FIG. 2.
Figure 5:
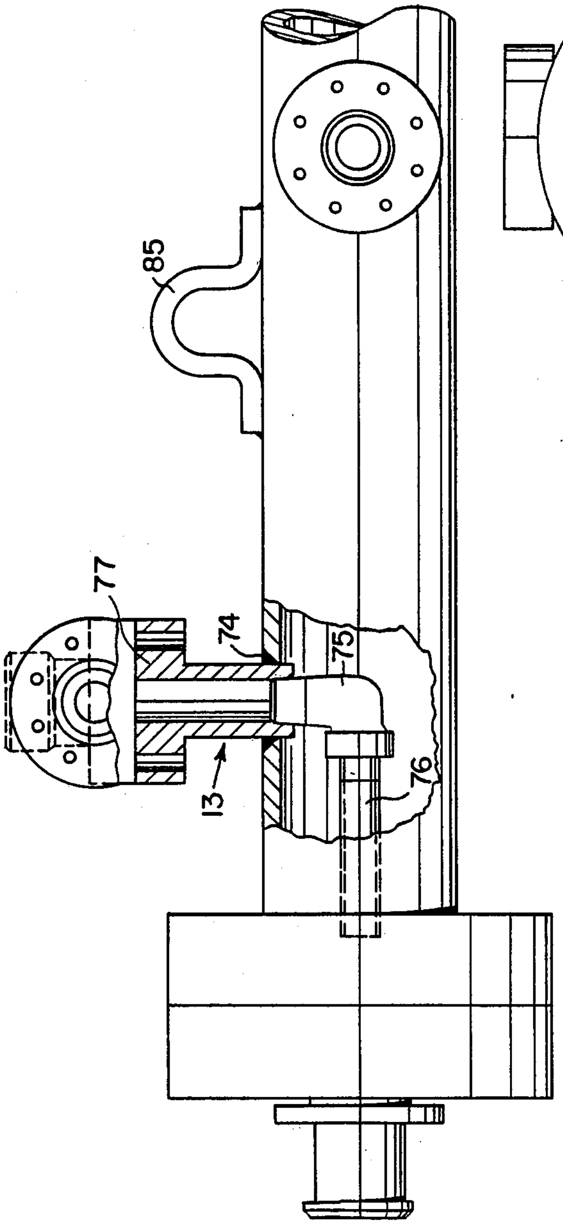
FIG. 5 is an election view partially in section of part of FIG. 1.
Figure 4:
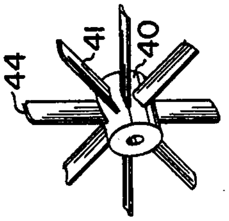
FIG. 4 is a perspective view of the vanes illustrated in FIG. 2 and their supporting hub.

The inlet fitting 11 shown in FIG. 2 is a rotated male end fitting having a recess on its inside into which a rubber O-ring seal 19 is fitted. There is preferably also a relief valve 20. A flange 21 is machined as part of fitting 11 to facilitate its attachment to suction flange 22 by bolts 23. Suction flange 22 has a recess 24 at its inlet to receive the discharge end 25 of inlet fitting 11. A seal between fitting 11 and suction flange 22 is provided by O-ring 26. Suction flange 22 is bolted by bolts 27 to flange 28 which is permanently welded by welds 29 on to the inlet end of outer casing pipe 10. Suction flange 22 is machined to provide an annular projection 30 which fits inside the bore of casing 10, and is sealed with respect to the bore by a pair of O-rings 31. These O-rings 31 fit into grooves 32 in annular projection 30. The central bore of suction flange 22 has a straight section 33 which opens out to a conical shape 34 so as to effect the transition between the inside diameter of the high pressure frac line and the larger inside diameter of the outer casing pipe 10. For example, the high pressure frac line may have a 3-inch diameter and the inside diameter of outer casing pipe 10 may be 7 inches. As a further example, the length of casing 10 may be 108 inches, but it will be appreciated that other dimensions may be used, depending on the need for more or less internal volume. Similarly, variation can occur with other stated dimensions which will be referred to. Within and coaxial with casing 10 there is a cylindrical sandscreen 35 which may, for example, be 57½ inches long and have an inside diameter of 3 inches and an outside diameter of $3\frac{7}{8}$ inches. At the upstream end of sandscreen 35 there is an adaptor fitting 36 the end of which is closed off by end plug 37. A cone 38 fits against end plug 37 to assist in guiding the flow from the inlet towards the periphery of outer casing pipe 10 and to avoid eddies. Cone 38 is oriented so that it diverges in the direction of flow. In advance of cone 38 there is a vane 39 which is shaped similarly to the impeller in a turbine engine. It includes a central hub 40 to which a number of blades 41 are welded. Blades 41 are positioned on hub 40 at an angle diagonal to the central bore so as to initiate a spiralling motion in injected slurries as the slurry moves past the blades 41. Vane 39 together with cone 38 therefore imparts a generally helical motion to the slurry and this helical motion persists as the slurry flows between casing 10 and sandscreen 35. Stud 42 passes through central bore of hub 40, cone 38 and plug 37 and is engaged by nut 43 to hold these components in assembled relationship. The peripheral edges 44 of blades 41 also assist in maintaining stud 42 in an axial position. It is to be noted that vane 39 is not intended to rotate on stud 42 but in the preferred embodiment of the invention remains in a fixed position during operation. At the downstream end of sandscreen 35 there is an adaptor fitting 45 which is conically shaped and generally similar to adaptor 36, except that it converges in a downstream direction. Adaptor 45 has threads which engage the threaded male end of a street elbow 46. Elbow 46 turns at right angles to communicate with the bore 47 of fitting 14. Fitting 14 is permanently secured to casing 10 by welds 48 and has a flange 49 to enable it to be secured by bolts 50 to a flange 51 forming part of flow control valve 52. At the junction between flanges 49 and 51 there is an O-ring 53. Assembly flange 54 is welded at 55 on the opposite side of casing 10 to fitting 14. It has a bore 56 having a common axis with that of the bore of fitting 14. Assembly flange 54 has a cover 57 secured to flange 54 by bolts 58. O-ring 59 provides a seal between flanges 54 and 57. A metal dowel 60 with a pin 61 secured to its internal end extends through the bore of flange 54 and serves to hold street elbow 46 in place during the operation of the concentrator. A rubber spacer 62 is placed between dowel 60 and cover 57 to maintain pressure on dowel 60 and therefore on elbow 46 to assist in maintaining elbow 46 firmly in place. Cover 57 may be removed for the purpose of maintenance. An hexagonal nut 63 is welded to elbow 46 with its bore axis on the centre line of casing 10. Nut 63 receives a screw 64 which passes successively through washer 65; first rubber baffle 66; double flanged spacer 67; second rubber baffle 68; double flanged spacer 69; third rubber baffle 70 and single flanged spacer 71. Rubber baffles 66, 68 and 70 are in the form of circular discs which are supported by washer 65 and the flanges 72 of spacers 67, 69 and 71 so as to have unsupported annular outer edges 73 which can resiliently deflect in the direction of flow. Gas inlet fitting 13 is welded at 74 into a hole cut through the wall of outer casing 10. The inner end of fitting 13 has an elbow 75 leading to a pipe 76 which is arranged to be coaxial with casing 10. The outer end of gas inlet fitting 13 has a flange 77 for connection to the high pressure gas line (R) of FIG. 1. At the discharge end of casing 10 there is a flange 78 which is generally similar to flange 22 to receive discharge fitting 12. Flange 78 has a conical entrance 79 to effect the transition between the inside diameter of casing 10 and the inside diameter of the high pressure frac line((P) in FIG. 1). O-rings 80 provide a seal between flange 78 and casing 10. An end flange 81 is secured to casing 10 by welds 82 and is joined to flange 78 by bolts 83. Flange 78 has a recess 84 to receive fitting 12. There may for convenience, be provided a lifting eye 85 secured to casing 10 as illustrated in FIG. 5.

DETAILED DESCRIPTION OF THE OPERATION OF THE PREFERRED EMBODIMENT

In FIG. 2 the proppant/fluid slurry enters through inlet fitting 11. Fixed vane 39 serves to initiate a spiralling action. As the slurry passes over the blades 41 it is forced towards the outside of the space 86 between outer casing 10 and sandscreen 35. It then continues to spiral around sandscreen 35 as it moves through the concentration zone 16 in the direction of the outlet. Cone 38 functions as a deflector to aid in causing the spiralling slurry to move to the outside of space 86 and prevent it from forming an eddy behind vane 39 which could disrupt the horizontal spiralling of the slurry. Since normal proppants such as sand or glass beads have a higher specific gravity than normal carrier fluids such as water the centrifugal forces created within the spiralling slurry cause the proppant materials to migrate to the inside surface 87 of outer casing pipe 10, leaving the fluids free to move down the central area of space 86. Accordingly the spiralling or helical motion assists in keeping much of the proppant away from the screen, thereby improving its efficiency and decreasing the possibility of plugging. This is however achieved without rotating parts which could readily jam. Proppant free fluid is drawn off through high pressure sandscreen 35 as it collects in the centre of casing pipe 10. As the fluid is removed, it leaves the concentration zone via fitting 14 and flow control valve 15. The high pressure flow control valve 15 simply serves to regulate the quantity of fluid drawn off. In its absence there would be a tendency for the high pressures experienced within the casing to force all but the surface bound fluid out of the slurry. The flow control valve 15 therefore controls proppant concentration by retarding fluid removal to the desired extent. The concentrated slurry then passes along mixing zone 17. The function of the rubber baffles 66, 68 and 70 is two-fold. Their primary function is to increase the velocity of the concentrated slurry as it moves toward the foaming zone. As the slurry moves around the baffles the reduced flow area resulting from the baffles result in increased velocity in the slurry. This increase of velocity of the concentrated slurry as it moves through the constricted area between the edge of the baffles and the outer casing has the important effect of preventing back flow of gas from the foaming chamber to the fluid bleed-off outlet 14. A second function of the baffles 66, 68 and 70 is to break up and disperse "slugs" of concentrated slurry. Occasionally, as for example, when the proppant input is suddenly increased at the blender ((A) in FIG. 1) a slug of high proppant concentration slurry will move through the system. If this happens the mixing effect created by forcing the slug around the rubber baffles 66, 68 and 70 serves to increase the fluid content and equalize the proppant concentration within the totality of the slurry passing through the concentrator. The flexible nature of the rubber baffles prevents them from causing the whole casing to plug up with proppant and "sand-off" if a highly concentrated proppant slug moves through the system. The resilience of the rubber baffles causes them to return to their initial position after deflection. The foaming gas is injected through gas inlet 77 and injection pipe 76. Injection pipe 76 is down the centre line of the discharge outlet so that gas flow through it will aid in forcing the foamed slurry out into the high pressure frac line ((Q) in FIG. 1). Turbulence within the foaming slurry is caused by the reduction in cross sectional flow area at conical portion 79 of discharge flange 78 in conjunction with the increased velocity thereby caused. There is also a turbulence in mixing zone 17 which keeps the slurry thoroughly mixed, and there may be some residue of this turbulence when the slurry reaches the foaming zone.

The primary purpose of assembly flange 54 and cover 57 and holder dowel 60 is to facilitate assembly. If cover flange 57 together with dowel 60 and pin 61 is removed and if suction flange 22 is also removed, the entire internal assembly including vane 39, sandscreen 35, street elbow 46 and the rubber baffle assembly mounting on bolt 64 can be removed as one piece through the inlet end of the high pressure casing pipe. By having assembly flange 54 located opposite the flow control valve inlet 14, assembly of the apparatus is simplified. Elbow 46 can be fitted into the flow control valve simply by reaching in through the bore of assembly flange 54 to guide elbow 46 into the recess 88 of fitting 14.

The embodiments of the invention in which an exclusive property or privilege is claimed are defined as follows:

1. An apparatus for concentrating a proppant/fluid slurry and foaming the concentrated slurry which comprises a unitary cylindrical casing containing, in order, an inlet, a concentration zone, a mixing zone, a foaming zone, and an outlet for foamed fluid slurry, said inlet, concentration zone, mixing zone, foaming zone and outlet being in axial alignment with one another along the length of said cylindrical casing, so as to permit axial flow of slurry from said inlet to said outlet;

fixed deflector means located in the concentration zone to impart a helical path flow to slurry passing into said concentration zone;

a fixed cylindrical screen in the concentration zone downstream from the deflector means with reference to the direction of axial flow, said cylindrical screen defining a central cylinder coaxial with and within the unitary cylindrical casing, the ends of said cylinder being closed to the entry of slurry from the unitary cylindrical casing into the central cylinder defined by the screen; and fluid outlet means for withdrawing fluid from the central cylinder.

2. Apparatus as claimed in claim 1 additionally comprising a plurality of resilient baffles in the mixing zone oriented transversely to the direction of axial flow through the mixing zone.

3. Apparatus as claimed in claim 2, additionally comprising a gas pipe having a gas outlet in the foaming zone and opening in the downstream direction of the axial flow of concentrated fluid slurry, whereby to introduce gas into the slurry to foam the slurry.

4. Apparatus as claimed in any of claims 1, 2 or 3, additionally including a flow control means in said fluid outlet means to control the amount of fluid withdrawn from the central cylinder.

5. Apparatus for concentrating a proppant/fluid slurry, comprising a cylindrical casing, having an inlet for the proppant/fluid slurry that is to be concentrated;

a diverging conical passage communicating between the inlet and the interior of the casing;

an outlet for the concentrated slurry;

a converging conical passage communicating between the interior of the casing and said outlet;

an additional outlet for fluid withdrawn from the proppant/fluid slurry;

means for withdrawing fluid from the proppant/fluid slurry comprising an elongated cylindrical screen arranged axially of the casing and inside the casing such that fluid must pass through such screen when passing between the inlet and the additional outlet for fluid; and stationary vanes angled to cause proppant/fluid slurry entering through the inlet to flow in a helical path in the space between the casing and the cylindrical screen, the outlet for the concentrated slurry also communicating with said space.

6. An apparatus for concentrating a proppant/fluid slurry and foaming the concentrated slurry comprising:

a casing;

an inlet to the casing for the slurry that is to be concentrated;

a diverging conical passage communicating between the inlet and the interior of the casing;

an outlet for foamed concentrated proppant/fluid slurry;

a converging conical passage communicating between the interior of the casing and said outlet;

means for withdrawing fluid from the proppant/fluid slurry admitted through the inlet in a concentration zone through an additional outlet to provide a concentrated proppant/fluid slurry;

a passage including a mixing zone to conduct the concentrated proppant/fluid slurry to a foaming zone where the slurry is foamed with gas under pressure; and at least one resilient baffle in said passage extending transversely to the direction of flow through the passage, said baffle providing restricted flow past the baffle to increase the velocity of the concentrated slurry so as to disperse slugs of slurry and to avoid back flow of gas.

7. An apparatus as in claim 6 in which there is a plurality of said baffles.

8. An apparatus as in claim 6 in which a gas pipe having an outlet facing in the direction of flow of the concentrated proppant/fluid slurry is disposed in the foaming zone to foam the slurry.

9. An apparatus as in claim 6 in which the concentration zone, the mixing zone and the foaming zone are in axial alignment in an undivided cylindrical casing.

10. An apparatus as in claim 9 in which the inlet and outlet for the slurry are in axial alignment with the cylindrical casing.

11. An apparatus as in claim 6 in which the means for withdrawing fluid from the proppant/fluid slurry comprises an elongated cylindrical screen extending axially of the casing and communicating with said additional outlet and with a flow control valve to control the amount of fluid withdrawn from the slurry.

12. An apparatus as in claim 11 in which stationary angled vanes are arranged to cause proppant/fluid slurry passing from the inlet to the concentration zone to flow in a helical path in the space between the casing and the elongated cylindrical screen.

13. An apparatus as in claim 12 in which a deflector cone is located upstream of the elongated cylindrical screen to assist in directing the incoming slurry in a helical path adjacent to the interior surface of the casing.

14. An apparatus as in claim 13 in which the deflector cone is downstream of the angled vanes.

15. An apparatus for concentrating a proppant/fluid slurry comprising a cylindrical casing, an inlet flange at the inlet end of said cylindrical casing, a tubular sandscreen coaxial with the cylindrical casing and mounted on said inlet flange, a fluid removal outlet fitting secured to the side of the cylindrical casing and having an inwardly facing recess, an elbow communicating between the interior of the tubular sandscreen and the fluid removal outlet removably fitting within said recess, an assembly flange at the diametrically opposite side of the cylindrical casing to the fluid removal outlet, said assembly flange having a removable cover and locating means within it projecting into the cylindrical casing to engage said elbow and hold said elbow in position in the recess, said flange, sandscreen and elbow being removable as a unit axially of the cylindrical casing for maintenance by removing said cover and withdrawing said means projecting into the cylindrical casing.

16. An apparatus as in claim 15 in which said elbow has connected to it an axially extending member supporting transverse baffles to define a mixing zone, the axially extending member and baffles being adapted to be withdrawn for maintenance with the sandscreen and elbow.

17. An apparatus as in claim 15 in which a stationary vane is mounted in advance of the sandscreen to impart a helical motion to the proppant/fluid slurry and in which said vane is connected to said inlet flange and sandscreen so as to be removable with them for maintenance.

18. An apparatus for concentrating a proppant/fluid slurry comprising a cylindrical casing, an inlet flange at the inlet end of said casing, a fluid removal outlet fitting secured to the side of the cylindrical casing, a tubular sandscreen in the casing, detachable means communicating between the interior of the tubular sandscreen and the fluid removal outlet, locating means accessible from the exterior of the casing to maintain the tubular sandscreen normally in coaxial relationship with the cylindrical casing and to hold said detachable means in position, said inlet flange, sandscreen and detachable means being removable as an assembly for maintenance upon the withdrawal of said locating means.

19. An apparatus as in claim 18 in which a mixing member adapted to extend coaxially of the cylindrical casing is connected to said detachable means so as to be removable as part of the assembly.

* * * * *